(12) United States Patent
Peytavit et al.

(10) Patent No.: US 7,442,934 B2
(45) Date of Patent: Oct. 28, 2008

(54) BOLOMETRIC DETECTOR, DEVICE FOR DETECTING SUBMILLIMETRIC AND MILLIMETRIC ELECTROMAGNETIC WAVES THAT USES SUCH A DETECTOR

(75) Inventors: Emilien Peytavit, Fontaine (FR); Jean-Louis Ouvrier-Buffet, Sevrier (FR)

(73) Assignee: Commissariat A L'Energie Atomique, Paris (FR)

( * ) Notice: Subject to any disclaimer, the term of this patent is extended or adjusted under 35 U.S.C. 154(b) by 11 days.

(21) Appl. No.: 11/393,973

(22) Filed: Mar. 30, 2006

(65) Prior Publication Data

US 2006/0231761 A1    Oct. 19, 2006

(30) Foreign Application Priority Data

Apr. 18, 2005  (FR)  .................................. 05 03836

(51) Int. Cl.
*G01J 5/00*  (2006.01)
(52) U.S. Cl. .................................................. 250/338.1
(58) Field of Classification Search ............... 250/338.1
See application file for complete search history.

(56) References Cited

U.S. PATENT DOCUMENTS 6,292,140 B1    9/2001   Osterman
6,329,655 B1 *  12/2001  Jack et al. ................. 250/338.1
6,891,503 B1 *  5/2005   Savry et al. ........... 343/700 MS
2004/0252065 A1  12/2004  Agnese et al.
2006/0076493 A1 *  4/2006   Bluzer ...................... 250/338.1

FOREIGN PATENT DOCUMENTS

FR       2 855 609 A1    12/2004
WO       WO 00/40937 A1   7/2000

\* cited by examiner

*Primary Examiner*—David P. Porta
*Assistant Examiner*—Marcus H. Taningco
(74) *Attorney, Agent, or Firm*—Burr & Brown

(57) ABSTRACT

This bolometric detector for electromagnetic radiation comprises:
- a receiving antenna (1) intended for collecting electromagnetic radiation and thus ensuring electromagnetic coupling;
- a resistive load capable of converting the electromagnetic power collected into heating capacity;
- a thermometric element (4) connected to the receiving antenna (1) via the resistive load and thermally isolated from a support substrate (2), capable of accommodating an electronic circuit that includes means of electric excitation (stimuli) and means of pre-processing the electric signals generated by said detector.

The receiving antenna (1) is itself isolated from the support substrate (2).

11 Claims, 3 Drawing Sheets

BOLOMETRIC DETECTOR, DEVICE FOR DETECTING SUBMILLIMETRIC AND MILLIMETRIC ELECTROMAGNETIC WAVES THAT USES SUCH A DETECTOR

FIELD OF THE INVENTION

The present invention relates to a bolometric detector and to a device for detecting electromagnetic waves, especially millimetric and submillimetric waves, that uses such a detector.

It also relates to the process for producing this detector.

The detection of millimetric waves and, more especially, submillimetric waves has a certain number of attractions, especially on a scientific and technological level.

In fact, this wavelength domain corresponds to many excitation phenomena in matter (phonons, rotation of molecules, intraband transition, etc.). Consequently, the detection of these waves and their interpretation have many applications, especially in the field of analysing atmospheric pollutants, in biophysics because of the absorption of these waves by liquids and also in telecommunications, radio astronomy, anticollision radar systems, biomedical imaging, etc.

Two different physical principles are currently used in order to detect millimetric and submillimetric waves.

The first of these involves detecting the electromagnetic waves by means of an antenna so as to create an electric signal which is processed by an electronic circuit that operates at the frequency of the wave. The drawback of detectors that operate using this first principle is that they are extremely limited in terms of frequency.

In addition, given the fact that such detectors are generally arranged in an array structure, the heat dissipation of the corresponding circuits is relatively high, of the order of one Watt for a 32×32 array, and this is another drawback.

The second known technical principle involves using an antenna to detect electromagnetic waves which is able to create a heat flux, measurement of which is equivalent to the signal to be detected. The detectors used in conjunction with this principle traditionally consist of bolometric-type detectors.

In a known manner, thermal detectors, the family to which bolometric detectors belong, absorb the power of incident electromagnetic radiation, convert it into a heat which is then converted into a signal as a result of the concomitant temperature increase compared with a reference temperature within a determined range, making it possible to associate these temperature variations with electric signals that correspond to actual measurement of the incident electromagnetic flux. It must, however, be realised that, since one is measuring a variation in temperature, said detector must be as thermally isolated as possible in order for the measurement not to be falsified by interference from components to which it is mechanically and electrically connected.

Due to the effect of incident radiation, the detector warms up and relays this concomitant temperature increase to the thermally sensitive material. This increase in temperature causes a variation in a property of said sensitive material such as the appearance of electric charges due to the pyroelectric effect, a variation in capacitance due to a change in the dielectric constant in the case of capacitive detectors, a variation in voltage due to the thermoelectric effect in the case of thermocouples or a variation in resistance in the case of bolometric detectors.

The use of bolometric detectors is widespread in the field of infrared detection. These detectors classically consist of a suspended membrane which comprises a thin (typically from 0.1 to 1μ) layer of temperature-sensitive bolometric material, two coplanar electrodes and an absorber, the function of which is to pick up the electromagnetic radiation in order to convert it into heat inside the structure. The membrane is suspended above the support substrate by anchoring points or fixing studs capable of isolating said membrane from the substrate. These structures, also referred to as "posts", are used to apply drive potentials or stimuli to the conductive parts or electrodes of the bolometric detector via flat elongated structures that are also referred to as "isolating arms". These therefore conduct electricity but have the highest possible thermal resistance.

In order to achieve satisfactory performance, the bolometric material, i.e. the sensitive material, must have a low calorific mass, be thermally well isolated from the substrate and, finally, must be highly sensitive in terms of converting a temperature rise into an electric signal.

In a known manner, the support substrate, generally made of silicon, accommodates a readout circuit consisting of an electronic circuit that includes means of sequentially addressing or multiplexing the elementary detectors, means of electric excitation (stimuli) and means of pre-processing the electric signals generated by said elementary detectors. This being so, such a readout circuit allows serial conversion of the signals obtained from the various elementary detectors and makes it possible to relay them to a reduced number of outputs so that they can be analysed by a standard imaging system such as, for example, an infrared camera.

Advantageously, in order to optimise the performance of these detectors, they are encapsulated inside a package containing a vacuum or low-pressure inert gas which conducts heat and having a window which is transparent to the wavelength band in question.

Traditionally, the bolometric material used consists of p or n type slightly resistive or highly resistive polycrystalline or amorphous silicon but may also be made of vanadium oxide ($V_2O_5$, $VO_2$) or of a cuprate (YBaCuO) produced in a semiconductor phase.

The use of such bolometric detectors has been extensively described in relation to detection of infrared wavelengths. For this wavelength range, it is possible to simultaneously fit both thermometric and incident infrared radiation absorption functions on the bolometer matrix.

In fact, a system for detecting electromagnetic radiation has to have dimensions approaching the order of magnitude of the wavelength in question in order to be effective. There is a compromise between the power collected (which is proportional to the surface area of the detector) and the spatial resolution. The diffraction phenomena that are inherent to any optical system limit the spatial resolution to a value of the order of the wavelength in the dimensions of its plane. The ideal dimensions for a detector are therefore of this order of magnitude.

Thus, an array or matrix of infrared detectors having dimensions of 25×25 $\mu m^2$ is capable of accommodating both these functions. This being so, the absorber, i.e. the membrane that supports the sensitive bolometric element, ensures both electromagnetic coupling with the incident radiation and therefore absorption of said radiation and as well as conversion of this radiation into a heat flux due to the Joule effect.

In the field of submillimetric or even millimetric wavelengths, the above logic results in membrane sizes of the same order of magnitude. However, the calorific mass, mechanical strength and radiation losses of a membrane having such dimensions are impossible to envisage in terms of durability of the detectors, let alone in terms of the quality of the measurements to be made.

Given this, it becomes necessary to separate the electromagnetic coupling function from the function of converting electromagnetic power into heating capacity. The first of these two functions is performed by means of a receiving antenna and the second function is performed by a resistive load associated with the antenna.

DESCRIPTION OF THE PRIOR ART

Such bolometric detection devices with an antenna, capable of operating at temperatures from 150 to 300 K, i.e. ambient temperature, are known. These devices use strips or arrays of such detectors.

FIG. 1 shows a diagram illustrating the operating principle of such an antenna bolometer according to the prior art.

This essentially consists of an antenna (1) comprising a conductive layer deposited on a non-conductive substrate (2). It comprises a resistive metal (3) which constitutes both the resistive load of the antenna capable of generating the heating capacity and the isolating arms of a thermometer or bolometer (4) comprising a thermoresistive material such as, for example, amorphous silicon or vanadium oxide. As can be seen, there is a cavity (5) underneath the thermometer (4) allowing thermal isolation of the latter.

The electric current generated in the antenna (1) by the incident radiation is dissipated in the isolating arms (3) due to the Joule effect.

Advantageously, a reflective metal surface makes it possible to optimise absorption for a given wavelength range. This reflector is generally positioned at a distance equal to n times $\lambda/4$ of the antenna, n being an integer.

The need to thermally isolate the detector itself, which is made of a bolometric material, in order to allow detection to be optimised, is readily apparent. One of the difficulties that has to be overcome with such detection devices is the limitation imposed by their actual construction because of the proportionality of thermal conductivity and electric conductivity in any conductive material which takes a simple form in the case of metals: Wiedemann Franz's law.

Thus, the electrical link between the antenna and the thermometer is necessarily accompanied by a thermal link which has a significantly adverse effect on the performance of bolometers since they measure a variation in temperature relative to a reference value.

Document WO 00/40937, for example, describes a detection device which uses such antenna bolometers. The antenna described is a bow-tie type antenna and is placed above a metal surface at a distance equal to a quarter of the operating wavelength of the detector, thereby defining a so-called quarter-wave cavity which is well known per se. In addition, the resistive load consists of the load resistor of the antenna. The thermometer consists of a monocrystalline silicon junction diode, thermal isolation of which is obtained by etching the rear surface of the substrate made of silicon.

The special-shaped antenna is deposited on a layer of silicon oxide SiO which, because of the technology used (thin-film type), has a thickness e of the order of one μm. A bow-tie type antenna optimised for detection either side of a frequency of 1 THz has a surface area S of the order of 300×300 μm², i.e. approximately the square of the operating wavelength.

If edge effects are ignored, the thermal resistance between the antenna and the substrate can be determined by using the following equation:

$$Rth = \frac{1}{g}\frac{e}{S}$$

where g represents the thermal conductance of the material of which the antenna is made.

The thermal conductance of the substrate made of silicon oxide SiO is of the order of $g=1.35$ W·m$^{-1}$K$^{-1}$, and the thermal resistance between the antenna and the substrate is around 10 K/W. Given this assumption, the antenna is therefore virtually thermally grounded; in other words it is not thermally isolated and because of its mechanical and electrical connection to the thermometer, the latter is not satisfactorily thermally isolated.

In order to overcome this drawback, Document U.S. Pat. No. 6,329,655 proposes a detection device that also uses a bolometric detector. The antenna is of the same type as that in the previous document (bow tie) but capacitive or inductive coupling is introduced between the antenna and the load resistor. Coupling is obtained in the centre of the antenna. The thermometer or bolometer used is of the thermistor type, preferably with vanadium oxide $V_2O_5$. This coupling nevertheless requires a submicron gap between the antenna and the thermometer and this complicates the technology involved in producing such a detector considerably.

Once again, the antenna is not thermally isolated, only the thermoresistive material which constitutes the thermometer is effectively thermally isolated from the substrate, but not from the antenna.

Finally, Document FR 2 855 609 suggests positioning a reflecting surface underneath the bolometer at a distance that is strictly less than a quarter of the operating wavelength. The load resistance of the antenna is then of the order of one kΩ, which is equivalent to a thermal resistance which is still insufficient and therefore limits the performance of the detector. Moreover, such a high load resistance value is inevitably accompanied by a reduction in the absorption bandwidth which has a drastic impact on a passive detector, because the absorbed power is proportional to the bandwidth.

Summing up, there is therefore no satisfactory technical solution making it possible to achieve complete or virtually complete thermal isolation of the thermometer or bolometer relatively simply in terms of technology.

SUMMARY OF THE INVENTION

The invention proposes a solution to these various technical problems in the field of detecting millimetric and submillimetric electromagnetic waves.

Fundamentally, the general principle underlying the present invention is based on thermal isolation of the antenna from the substrate. The problem of thermal isolation between the thermometer and the antenna then no longer applies and thermal isolation of the assembly becomes independent of electromagnetic considerations.

Thus, the invention first relates to a bolometric detector for electromagnetic radiation, especially at frequencies from 100 GHz to 10 THz, and comprises:

receiving antenna for collecting said electromagnetic radiation and ensuring electromagnetic coupling;

resistive load capable of converting the electromagnetic power collected into heating capacity;

thermometric element connected to the receiving antenna via the resistive load and thermally isolated from a support substrate, capable of accommodating an electronic circuit that includes means of electric excitation (stimuli) and means of pre-processing the electric signals generated by said detector.

It is distinctive in that the receiving antenna itself is isolated from the support substrate, the antenna only being connected to the said substrate extremely indirectly and, especially, not on its main faces.

This being so, thermal isolation of the assembly consisting of the antenna, thermometric element and resistive loads is optimised because the only remaining contact occurs at one location, in particular the free edges of the antenna, i.e. those facing the thermometric element.

The assembly thus defined is kept suspended above the substrate advantageously by isolating arms which are electrically conductive but thermally isolating and themselves rest on anchoring points made on said substrate and are attached on the free edges of the antenna.

The antennas used can be of the dipole type, i.e. extend either side of the thermometric element, or be of the double-dipole type, i.e. equipped with two outputs on each of their areas where they are connected to the thermometric element.

BRIEF DESCRIPTION OF THE DRAWINGS

The way in which the invention is implemented and its resulting advantages will be made more readily understandable by the following description, given merely by way of example, reference being made to the accompanying drawings.

DETAILED DESCRIPTION OF THE INVENTION

Numbers that denote the same components have been retained throughout the various Figures.

Figure 1:
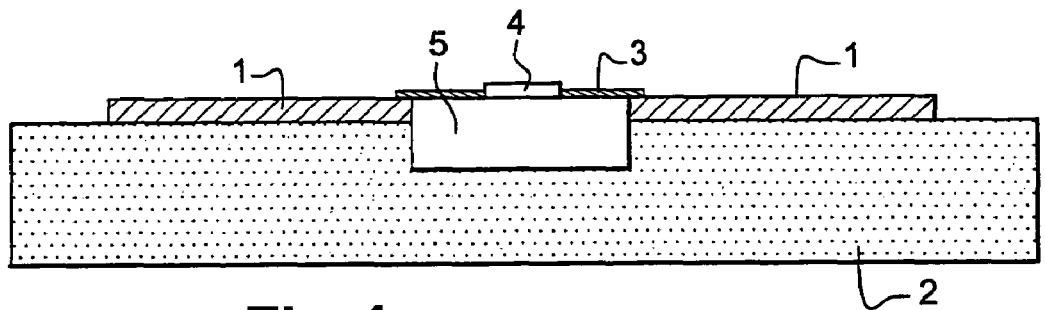
FIG. 1 is a schematic view of a bolometric detector with an antenna according to the prior state of the art.
Figure 2:
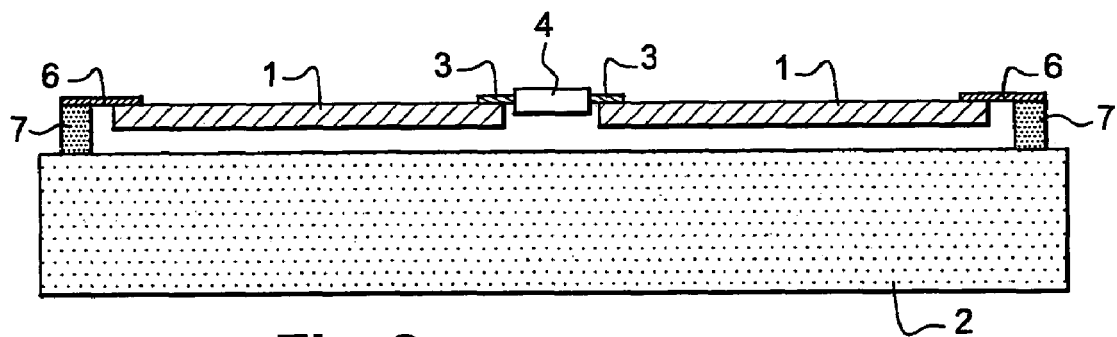
FIG. 2 is a schematic view of a bolometric detector with an antenna in accordance with the invention.

As is apparent in FIG. 2, the elementary detector according to the invention has an assembly consisting of the receiving antenna (1), the bolometer (4) and a load resistor (3), suspended above substrate (2) by means of isolating arms (6) which rest on posts (7) made for this purpose on said substrate.

These isolating arms (6) are thermally isolating so that the assembly thus defined is itself thermally isolated from the substrate, this constituting one of the essential objects of the invention.

In addition, these arms (6) are electrically conductive in order to allow stimuli to be applied to the bolometer (4) and to allow the electric signals generated by the latter to be collected subsequent to the detector being irradiated by electromagnetic radiation in the determined wavelength range.

Figure 3A:
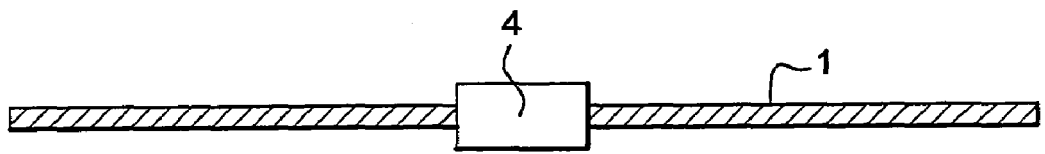
FIG. 3 shows a top view of a detector in accordance with the invention, equipped with a dipole antenna in FIG. 3*a* and equipped with a double-dipole antenna in FIG. 3*b*.
Figure 3B:
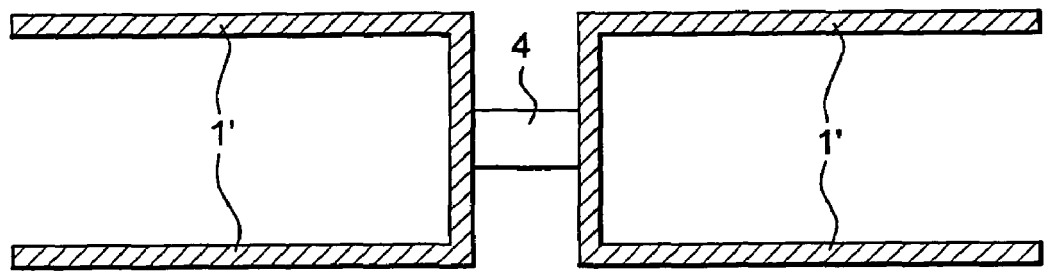

The detector described in relation to FIGS. 2 and 3*a* is equipped with a dipole type antenna. However, and as shown in FIG. 3, the antenna can be of the double-dipole type (1'). This being so, there is a small electrically conductive surface area which makes it possible to minimise the heat capacity and radiation losses of the assembly.

Nevertheless, radiation losses will be low in every case because the conductive layers used for the antenna have almost zero emissivity in infrared (and also over virtually the entire spectrum from the visible region to the millimetric region) because of the inherent characteristics of the materials used.

It has been demonstrated that, using a double-dipole type antenna consisting, for example, of a 1μ wide ribbon having a total length of 280μ and a width of 140μ made of a good conductive material such as metal (aluminium, gold, etc.), one obtains a thermal resistance of around 50 MK/W for a load resistance of 150Ω, compared with a value of 2.5 MK/W obtained using detectors according to the prior art. In other words, the thermal isolation of the suspended assembly is multiplied by a factor of 20, thus helping achieve the result sought after by the present invention.

Moreover, the absorption band obtained at −3 dB using such a detector also equipped with a metal reflector (not shown) positioned 75μ underneath the bolometer is approximately 1 THz.

Obviously, a band centred on 650 GHz or 850 GHz can also be obtained by using appropriate filters such as using slot arrays positioned in front of the detector.

Figure 4:
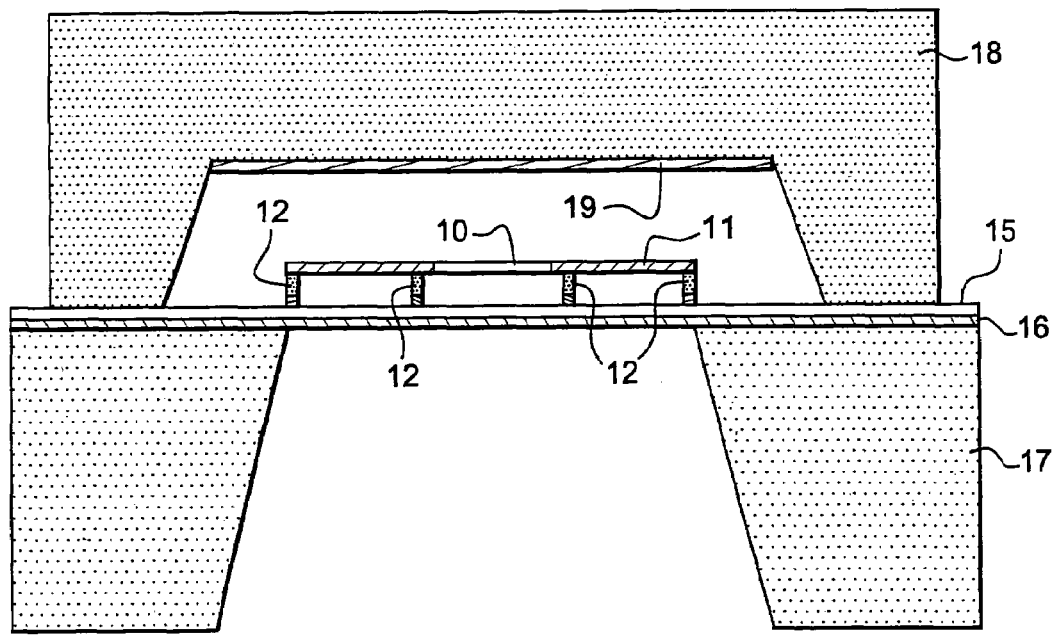
FIG. 4 is a schematic view of a bolometric detector with an antenna suspended over a quarter-wave cavity and FIG. 5 is a top view of it.
Figure 5:
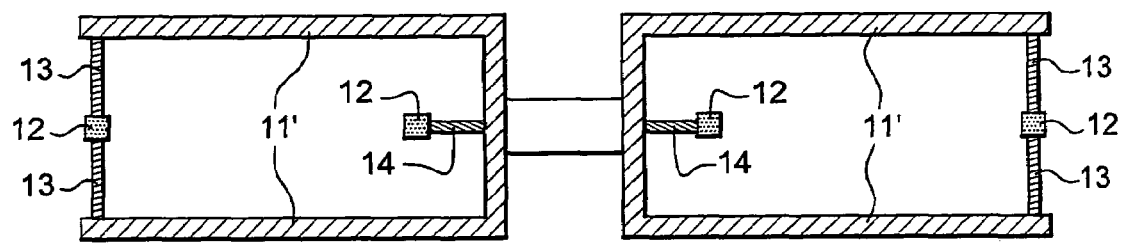

Another embodiment of the detector in accordance with the invention is shown in FIGS. 4 and 5. This comprises a thermometer (10), a dipole or double-dipole antenna (11, 11'), this assembly being suspended by anchoring points (12) made firstly in the vicinity of the free edges of the antenna and secondly in the immediate vicinity of the thermometer. Once again this assembly is thermally isolated from substrate (2) by isolating arms (13). The latter comprise either a single dielectric layer (13) made of silicon oxide SiO or silicon nitride SiN or a dielectric layer topped with a resistive layer made, for example, of titanium nitride TiN (14) in order to ensure stimuli are routed to the thermometer.

The substrate is a SOI substrate comprising a layer of silicon (15) having a thickness of 1 to 20μ, a second buried oxide layer (for example SiO) (16) having a thickness of 3000 Angströms to 2μ, and a solid substrate (17) which generally has a thickness of 400 to 500μ.

This assembly is integrated into a substrate (18) etched to a thickness equal to λ/4 where λ is the operating wavelength of the detector and the bottom of the etching is advantageously covered with a conductive layer (19) capable of acting as a reflector.

This configuration allows encapsulation of the detector and then requires illumination from the rear surface.

One embodiment of the bolometric detector according to the invention is described in greater detail below, making reference to FIGS. 6*a* to 6*e*.

The reader is first reminded that a certain number of classic microelectronic techniques are used. Production of the thin layers of various elements (0.005μ to 1μ) made of an insulating material (SiN, SiO, ZnS etc.) and an amorphous or polycrystalline semiconductor (Si, Ge, SiC, a-Si:H, a-SiC:H, a-SiGe:H, etc.) is obtained using low-temperature deposition techniques that are usually used for these materials: cathode sputtering, Low Pressure Chemical Vapour Deposition (LPCVD) or Plasma Enhanced Chemical Vapour Deposition (PECVD).

Any doping of these layers is obtained by introducing a dopant gas (BF3, PH3, etc.) into the reactor or by ion implantation. These materials are generally etched using plasma-assisted chemical etching processes.

The metallic materials (Ti, TiN, Pt, Al, Pd, Ni, NiCr, etc.) which make up the resistive elements, electrodes and various metallised areas such as interconnections, the antennas or antenna load resistor are also deposited by cathode sputtering or LPCVD or PECVD. These metallised areas are defined by chemical or plasma etching processes or by a process known as "lift off". The thickness of these layers ranges from 0.005µ to 1µ.

The tracks and bonding pads made of metal (20), for example aluminium, on which the support posts will be fabricated are produced during an initial stage (FIG. 6*a*) by deposition, photolithography and etching. These layers are deposited on a stack consisting of silicon (15), the buried layer of silicon oxide (116) and the solid substrate (17).

After passivation by means of a deposited SiO layer (not shown), a sacrificial layer (21), from 1 to 10µ thick, made of polyimide, for example, is deposited, then an electrically insulating membrane (22) made of SiO or SiN, for example, is deposited, its function being to act as a mechanical support.

One or more metallic layers (23, 24), one of which at least is highly conductive (Al, Au) are deposited on the insulating membrane (22) and are intended to form firstly the antenna and secondly the electrodes for biasing the thermometer and the load resistor of the antenna (made of a resistive metal: TiN, TaN . . . ). These are all then etched through a resin mask (see FIG. 6*b*).

Figure 6A:
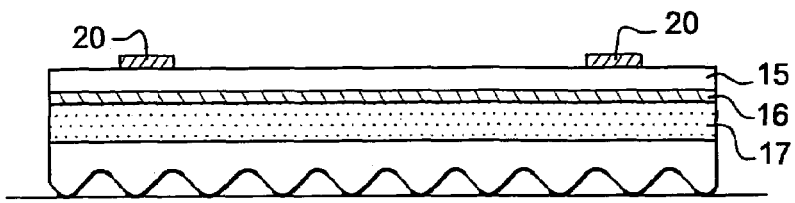
FIGS. 6*a* to 6*e* illustrate one embodiment of said bolometric detector in accordance with the invention.
Figure 6B:
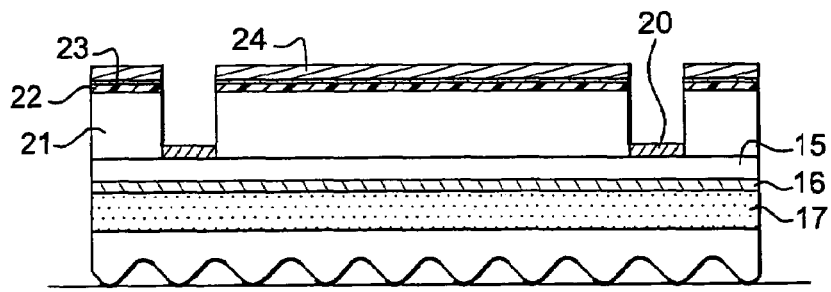
Figure 6C:
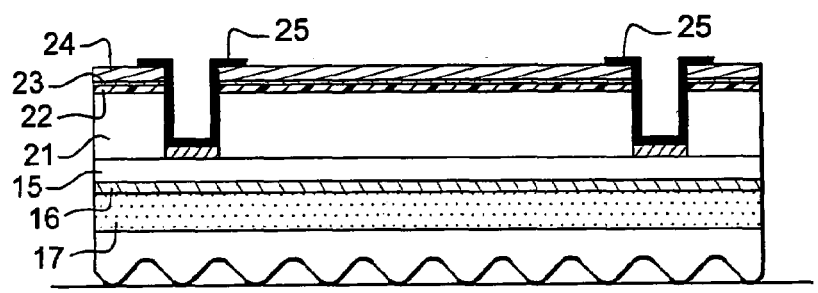
Figure 6D:
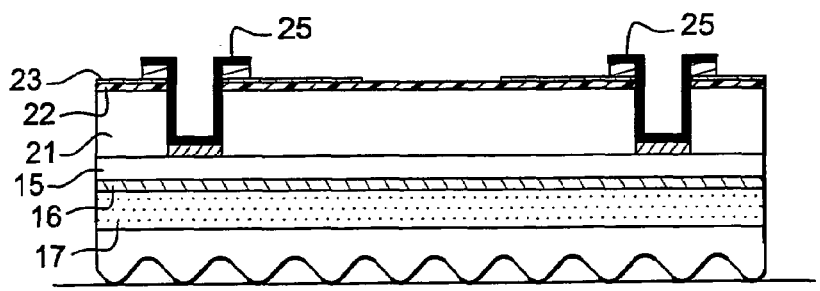

One or more metallic layers (25) intended to constitute the base of the electric contacts between the thermometer and the interconnections and made, for example, of titanium or titanium nitride TiN are then deposited and then etched (FIG. 6*c*).

A first conductive layer (25) is etched in order to form the antenna. Similarly, such a conductive layer (25) is etched in order to form the contact electrodes (see FIG. 6*d*).

The thermoresistive material (6) made of amorphous silicon or vanadium oxide, for example, is deposited and then etched through a resin mask which protects the thermometric area.

Figure 6E:
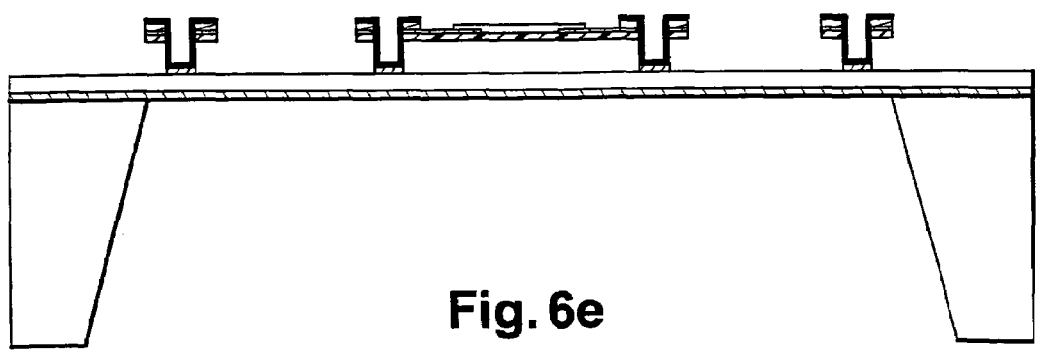

The substrate is then etched by Bosch-type plasma-assisted chemical etching (see FIG. 6*e*).

The last stage is to release the structures by etching the sacrificial layer.

The lid can be etched by using a wet chemical process. Before depositing or bonding it on the front in a vacuum (like the embodiment described in relation to FIG. 4), a conductive layer (Al, Au) roughly 1µ thick, preceded by an adhesion layer (e.g. titanium), is deposited by cathode sputtering.

The invention claimed is:

1. A bolometric detector for electromagnetic radiation comprising:
   a receiving antenna for collecting electromagnetic radiation and thus ensuring electromagnetic coupling;
   a resistive load for converting the power of the electromagnetic radiation collected into heating capacity;
   a thermometric element connected to the receiving antenna via the resistive load and thermally isolated from a support substrate, for accommodating an electronic circuit that includes means for electric excitation and means for pre-processing the electric signals generated by said detector,
   wherein the receiving antenna is itself isolated from all support substrates of the detector, and is never in direct contact with any of said support substrates.

2. A bolometric detector for electromagnetic radiation as claimed in claim 1, wherein the assembly consisting of the receiving antenna, the resistive load and the thermometer is suspended above the support substrate.

3. A bolometric detector for electromagnetic radiation as claimed in claim 2, wherein the assembly consisting of the receiving antenna, the resistive load and the thermometer is suspended above the support substrate by means of electrically conductive but thermally insulating isolating arms that themselves rest on anchoring points made on said substrate.

4. A bolometric detector for electromagnetic radiation as claimed in claim 1, wherein the receiving antenna is connected to said substrate on the free edge of its main faces.

5. A bolometric detector for electromagnetic radiation as claimed in claim 1, wherein the receiving antenna is connected to said substrate on the free edge of its main faces and in the vicinity of the thermometer.

6. A bolometric detector for electromagnetic radiation as claimed in claim 1, wherein the receiving antenna is of the dipole type or double-dipole type.

7. A bolometric detector for electromagnetic radiation as claimed in claim 1, wherein the thermometer is made of a bolometric material selected from the group comprising type p or n polycrystalline or amorphous silicon, vanadium oxides ($V_2O_5$, $VO_2$) and cuprates (YBaCuO) produced in a semiconductor phase.

8. A bolometric detector for electromagnetic radiation having frequencies from 100 GHz to 10 THz according to claim 1.

9. A device for detecting electromagnetic radiation, wherein it consists of a one- or two-dimensional array of elementary bolometric detectors electrically connected to a readout circuit and having the features defined in claim 1.

10. A device for detecting electromagnetic radiation having frequencies from 100 GHz to 10 THz, wherein it consists of a one- or two-dimensional array of elementary bolometric detectors electrically connected to a readout circuit and having the features defined in claim 8.

11. A bolometric detector for electromagnetic radiation comprising:
   a receiving antenna for collecting electromagnetic radiation and thus ensuring electromagnetic coupling;
   a resistive load for converting the power of the electromagnetic radiation collected into heating capacity;
   a thermometric element connected to the receiving antenna via the resistive load and thermally isolated from a support substrate, for accommodating an electronic circuit that includes means for electric excitation and means for pre-processing the electric signals generated by said detector,
   wherein a bottom surface of the receiving antenna is free from contact with any other parts of the detector.

* * * * *